US007167839B1

(12) United States Patent
Layne (10) Patent No.: US 7,167,839 B1
(45) Date of Patent: Jan. 23, 2007

(54) COLLECTION AGENCY DATA ACCESS METHOD

(75) Inventor: Kevin A. Layne, Coon Rapids, MN (US)

(73) Assignee: Commercial Recovery Corporation, Blain, MN (US)

( * ) Notice: Subject to any disclaimer, the term of this patent is extended or adjusted under 35 U.S.C. 154(b) by 552 days.

(21) Appl. No.: 09/435,198

(22) Filed: Nov. 5, 1999

(51) Int. Cl.
*G06F 17/60* (2006.01)

(52) U.S. Cl. .......................................... 705/40; 705/38

(58) Field of Classification Search ................. 705/38, 705/42, 44, 40, 34
See application file for complete search history.

(56) References Cited

U.S. PATENT DOCUMENTS

| | | | | | |
|---|---|---|---|---|---|
| 5,822,400 | A | * | 10/1998 | Smith ........................... | 379/34 |
| 5,920,848 | A | * | 7/1999 | Schutzer et al. .............. | 705/42 |
| 5,983,208 | A | * | 11/1999 | Haller et al. .................. | 705/40 |
| 6,070,177 | A | * | 5/2000 | Kao et al. ..................... | 707/10 |
| 6,163,272 | A | * | 12/2000 | Goode et al. .......... | 340/825.34 |
| 6,208,345 | B1 | * | 3/2001 | Sheard et al. ................ | 345/356 |

FOREIGN PATENT DOCUMENTS

JP                 04239970 A   *   8/1992

OTHER PUBLICATIONS

The ABC's of Debt Colletion; Collection Services; The ABC Companies, Inc.; Dec. 1, 1998.*
Blenheim debt agency first on Net with credit checking: New Zealand: New Internet Service by Creditmens; NZInfoTechWeekly (XXX); Sep. 28, 1998; p. 1.*

* cited by examiner

*Primary Examiner*—Elaine Gort
(74) *Attorney, Agent, or Firm*—Schwegman, Lundberg, Woessner & Kluth P.A.

(57) ABSTRACT

An account data access method allowing access to an agency account database, such as that of a collection or other debt recovery agency, from public sites over a network by agency affiliates and clients of the agency. The invention provides for secure access to a client's accounts using a web browser over the internet. The invention also provides for different levels of access to the accounts among different representatives of the client.

21 Claims, 6 Drawing Sheets

ONLINE LEDGER

| | | | |
|---|---|---|---|
| A6 — DEBTOR CODE | A23456 | | |
| DEBTOR NAME | FIRST DEBTOR 1 | STATUS: | |
| ADDRESS | 1234 ADDRESS AVE. | EMPLOYEE CONTACT: | JOHN WILLIAMS |
| CITY | DALLAS | EXTENSION DATE: | 04-14-95 |
| STATE | TX | COLLECTOR NUMBER: | 15 |
| HOME PHONE | 785-000-0000 | ZIP CODE | 80000 |
| ORIGINAL AMOUNT DUE | $1,000.00 | ASSIGNMENT DATE | 10-01-96 |
| TOTAL AMOUNT DUE | $500.00 | STATUS | ACT |

ACCOUNT TRANSACTIONS

| DEBTOR CODE | TRANSACTION DATE | COLLECTOR | TOTAL AMOUNT PAID |
|---|---|---|---|
| A23456 | 3/14/99 | 15 | $500.00 |

B6

COMMENTS

| DEBTOR CODE | COMMENT DATE | COLLECTOR | COMMENTS |
|---|---|---|---|
| A23456 | 03/02/99 | 15 | TT JOHN, ACK'D DEBT BUT CLAIMS SEVERE CASH FLOW PROBLEMS. EXPLAINED TO HIM MY CLIENT HAS WAITED LONG ENOUGH; MADE DEMAND FOR THE BALANCE. LFT HIM W/MY ADDRESS |
| A23456 | 03/03/99 | 15 | JOHN OUT OF THE OFFICE, TLK W/RECPT TO EMB. COULDN'T PROVIDE ANY ADD'L PH#S |

C6

D6 — SUBMIT A COMMENT

OTHER CLIENT INFORMATION

| CLIENT CODE: | AAA | REFERENCE CODE: | 315678 |
|---|---|---|---|

COLLECTION AGENCY DATA ACCESS METHOD

TECHNICAL FIELD

This invention relates generally to systems and methods for storing and retrieving account data. In particular, the invention pertains to a system and method for allowing secure client access to collection agency accounts over a network from a public site.

BACKGROUND

In conventional data access systems used by commercial recovery and other collection agencies, client account data is stored in databases maintained by various "collection agency software packages" and/or other databases or spreadsheets. This software is run on various computer hardware platforms running different operating systems. Access to the data is only available through the interfaces provided by the software and by a trained operator at the agency site. Typically, when a client requests data on a specific account or on a group of accounts, the request is routed to the appropriate person where it is acted upon immediately by telephone during business hours, or placed in an "In Basket" and worked as time and resources permit. This process may involve running queries on the database, creating spreadsheets, and writing status reports and letters. Client contact is often by telephone and depends upon the availability of both parties. The client then receives the requested data, but it is sometimes several days later, and the client only receives the data that the agency deems appropriate.

Data maintained by the databases of these "software packages" include but is not limited to the following fields: Debtor Code, Debtor Name, Debtor Address, Debtor City, Debtor State, Debtor Zip, Phone Number, Employee Contact, Extension Date, Collection Number, Assignment Date, Original Amount Due, Total Amount Due, Status, and Comments (each time an account is worked the collector enters a note describing the outcome of the call or contact). This information is usually never shown to the client but is used by the collectors as historical reference. This data is typically processed and manipulated by the collection agency software to schedule collector calls, print letters and other statements, prepare reports and provide collection agency operators with access to the data.

SUMMARY OF THE INVENTION

It would be advantageous for clients of collection agencies and other debt recovery companies to be able to access their accounts from their place of business, such as via the World Wide Web with a web browser at the client's site. In response to this need, the present invention in one embodiment is a system and method allowing access from public sites over a network to an agency account database, such as that of a collection or other debt recovery agency, by agency affiliates and clients of the agency from public sites over a network. In such a system, data items associated with the accounts belonging to clients of the agency are stored in the agency database. The database is accessed by a database server that interfaces with a network server. (The term "server" as used herein refers to a process that provides services to another process on the same or different host machine.) The network server processes database access requests received over a network from a user process controlled by a remote user at a public site or other remote location. In a typical embodiment, the network server is a web server (i.e., a hypertext transport protocol or HTTP server), and the user process is a web browser.

In order to provide for data security, the network server processes credentials transmitted by the user process in order to authenticate the identity of the user as either a client representative or an agency affiliate authorized to access the database. After a user is authenticated and the identity established, the database server processes data access requests in accordance with a defined access scheme such that a user process controlled by a representative of a particular client is allowed access only to data items associated with an account belonging to that client. The defined access scheme further provides for a plurality of access tiers such that a particular client representative is allowed access only to those client account data items allowed by the tier to which the representative has been assigned. The network server may also process credentials transmitted by the user process to authenticate the identity of the user as an agency representative or affiliate, with the tiered access scheme including an access tier for agency representatives that allows access to all data items contained in the database.

As aforesaid, the user process that the client uses to access the database is typically a web browser. In an exemplary embodiment, an authenticated client is presented with an HTML (hypertext markup language) form by the web server that the user fills in with a request for data. The web server then uses the information in the form to invoke a CGI (common gateway interface) program which then communicates with the database server to retrieve the requested information from the database. In another embodiment, the web browser executes a java applet downloaded from the web server that communicates with the database server over the network in order to retrieve the user requested data.

The database in an exemplary system is a relational database that defines one or more tables for containing one or more records therein, with the data items stored in defined data fields of the records according to type. In the case of collection agency accounts, the data items may include, e.g., a debtor identifier, location of debtor, amount owed on an account, account status, amount paid, and original amount owed. Each such data item would be stored in a data field of a record associated with a particular account. The records thereby serve to group the data items into data entities, with each of such data entities being associated with a particular account. In order to associate each record (and thereby each data item) with a particular account, an account identifier may be related to each record by, e.g., a table of records containing all data items in the database with the account identifier used as a key. In order to identify the client to which a particular account belongs, a client identifier is stored in the database as a data item, with each account identifier being related to a client identifier by, e.g., a table of account identifiers for each client identifier.

The database server in one embodiment may allow a user process to query the database with relational expressions (in, e.g., SQL) and be presented with data responsive to the query in accordance with the defined access scheme, thus providing a means by which a client can search for a specific account or group of accounts meeting the client's criteria. In another or the same embodiment, a client representative accessing the database through the web browser may request and be presented with a plurality of selected views of data items associated with accounts belonging to the client. ("Views" are derived relations or tables of a database.) Preferably, the system also allows a selected view to present data items sorted according to a selected data item, which the user specifies in the data request. Such views may thus present the data and/or subsets of a client's account data grouped in ways meaningful to collection agency clients.

For example, the selected view may present data items sorted according to debtor name, debtor identifier, the account identifier, state in which a debtor is located, account status, date on which an account was entered into the system, or by a range of amounts owed on an account. A selected view could then show any combination of the following: an account identifier, the name of a debtor on the account, a state in which the debtor is located, amounts paid on the account, amounts owing on the account, original amount due, account status, account transactions, and a collector's notes on an account. A selected view may also include a link to an online-ledger for each account represented in the selected view, wherein the online-ledger presents a plurality of data items associated with a single account, such as a presentation of all the data for a single account on a single screen, or a listing of all transactions of an account.

In a particular embodiment, the defined access scheme may be implemented by the views of the data that a client is permitted to see. In that case, the database server restricts a particular client's data access to only those views of the data items that include the client identifier for that client. Similarly, the access tiers are implemented by the database server restricting data access of particular client representatives to selected views of the data items to which the client has data access. The tiered access scheme may allow for differential client access to accounts owned by a client among representatives of the client in accordance with a management structure of the client, allowing managers to view and sort accounts of people working under them or at different divisions. In some embodiments, a particular access tier may allow a particular client representative to input data through the web site interface into the agency account database. Such data input operations by a client may include, for example, inserting comments into a designated record field, placing new business by entering a new account into the system along with data items associated with that account, or issuing instructions about accounts.

DETAILED DESCRIPTION OF A PREFERRED EMBODIMENT

A preferred exemplary embodiment of the present invention, as described below, is a collection agency data access system that provides clients of commercial debt recovery and collection agencies the ability to access pertinent account data in real-time over the internet, requiring only internet access and a web browser at the client site. The system provides the clients of collection agencies a powerful tool at their places of business for the management of their accounts placed with the collection agency. The system further provides the client with the ability to view individual accounts or status groups of accounts via different views and quick search functions, to communicate comments and/or instructions, and to place new accounts. It further allows clients to access this data outside of normal business hours and at a much-reduced cost as compared to prior methods and systems which impose costs on the client involving both time and long distance phone fees. The system presents the data stored on the collection agency system "as is," such that, with the exception of formatting to improve readability, the data presented is not edited or changed by the collection agency.

Figure 6:
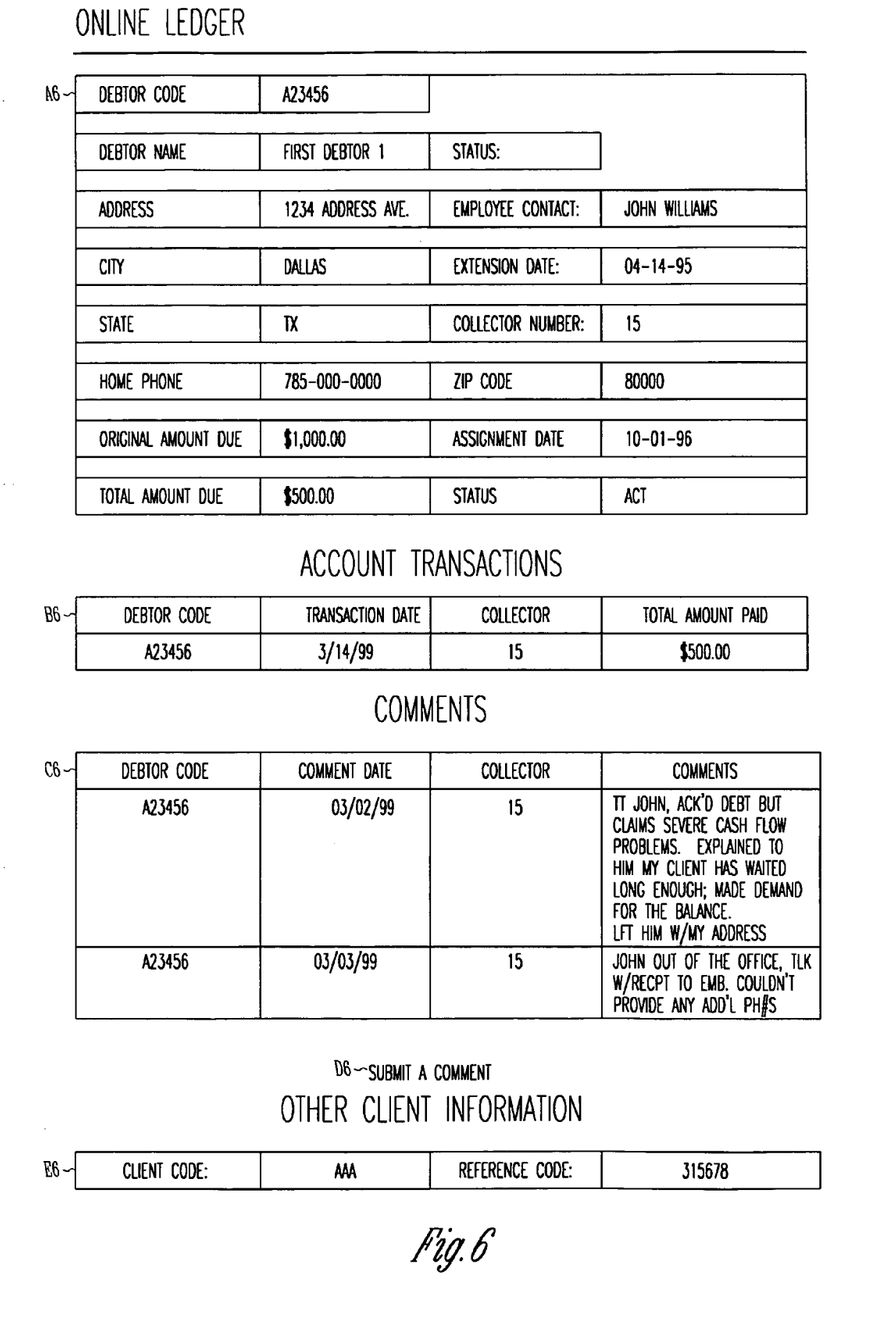
FIG. 6 is an actual print out of an On Line Journal using the print frame command of a web browser.

A "Quick Search" function is provided to further enable the client to find and ascertain the status of their accounts. When any individual account is accessed through any of the views or by using the Quick Search function, the account data is presented in an "On Line Ledger," as shown in FIG. 6. This ledger presents all the data for that account. This ledger form also lists account transactions or payments against the debt and the collector's notes showing dates of contact and the results of the call.

Figure 1:
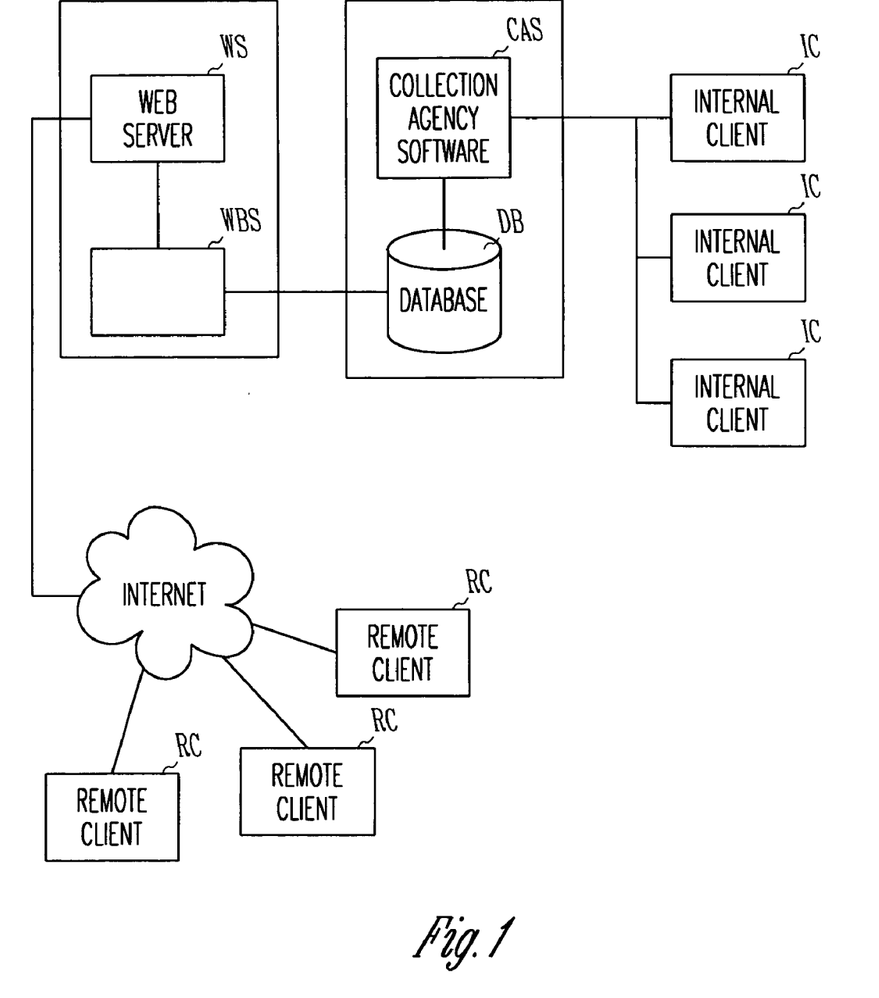
FIG. 1 depicts the components of a particular system embodying the invention.

FIG. 1 depicts a pictorial representation of a data processing system which may be utilized to implement the method and system of the present invention. As may be seen, the data processing system may include a plurality of computer systems and servers, such as separate web servers and production computers. Of course, a plurality of computers and servers is neither necessary nor desirable, in some cases, in order to implement the methods and systems of the present invention.

A single computer may be sufficient in certain situations to implement a satisfactory system in accordance with the invention. Furthermore, there are a number of core technologies and software tools that provide methods to access data in databases and present the data to users on the internet. What is used is in part determined by the platform and operating system that the host collection agency software resides on. Availability and cost of the skill sets required for the different implementations also determine what tools should be used in a particular situation. Advancements in software and computing platforms will, of course, determine what implementation tools are used in the future.

FIG. 1 shows that the database DB is maintained by the collection agency software CAS which interfaces directly with internal client process IC. The database DB may also be accessed by a database server DBS that communicates with users over a network. The database server may constitute custom software or a readily available commercial product that makes the data available to a plurality of formatting and web server software. The database server DBS interfaces to a web server (i.e., a hypertext transport protocol or HTTP server) WS that communicates with remote clients RC using web browsers over the internet. The database DB, agency software CAS, database server DBS, and web server WS may reside within the same or different host machines communicating over a network.

In a particular exemplary implementation, the database DB and agency software CAS reside in a host at the collection agency site. The data contained in the database DB is extracted and replicated by Lotus Notes Pump (or its successor Lotus Enterprise Integrator) in one or more hosts which clients are able to access over the internet. The replicated data is in the form of a Notes database accessible by the Lotus Domino program, which also provides the web serving function. Thus, in this embodiment, the functions of the database server DBS and web server WS are performed by Lotus Domino in conjunction with Notes Pump.

Figure 2:
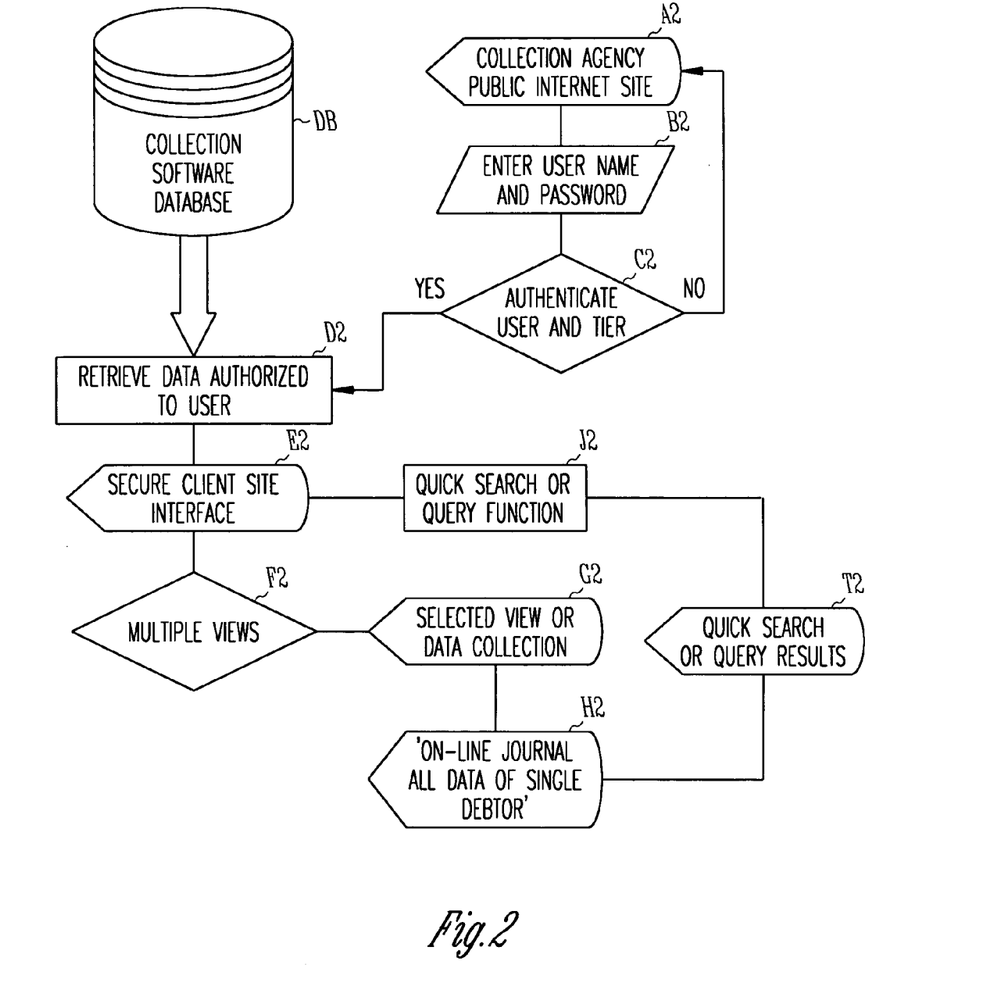
FIG. 2 is a flow chart depicting the collection agency clients navigation and the data flow associated with that client in the use of the system.

FIG. 2 shows a flow chart/block diagram illustrating the collection agency client's access and navigation of the system's interface using a web browser. Navigation through a World Wide Web based application is accomplished with a web browser through hypertext links embedded in downloaded web pages using the hypertext transport protocol. Starting at the public web site A2, the user requests access to the secure client site E2 and is prompted to enter a user ID and password at step B2. The user is then authenticated or refused access at step C2. A number of methods and systems for authentication that are readily available and well-known to those of skill in the art. If the user is granted access at step C2, data is retrieved from the database DB at step D2, which step is accomplished by the database server DBS in a manner dependent upon the core technologies used to implement the system and may be achieved through transactions utilizing CGI scripts, Java, JBDC, OBDC, SQL or other methods.

The account data may be displayed in multiple views, each sorting and sub-setting the data items associated with the accounts by different criteria. From the secure client site interface E2, the authenticated collection agency client is presented at step F2 with the choice of a plurality of views or predefined queries of the accounts placed with the collection agency by this client. When the collection agency client user requests a view from the choices presented at step F2, the user is presented with the chosen view at step G2. The user may then select an individual account and be presented with the "On Line Journal" at step H2. Alternatively, a quick search or query function may be invoked at step J2 with the results returned at step 12.

Figure 3:
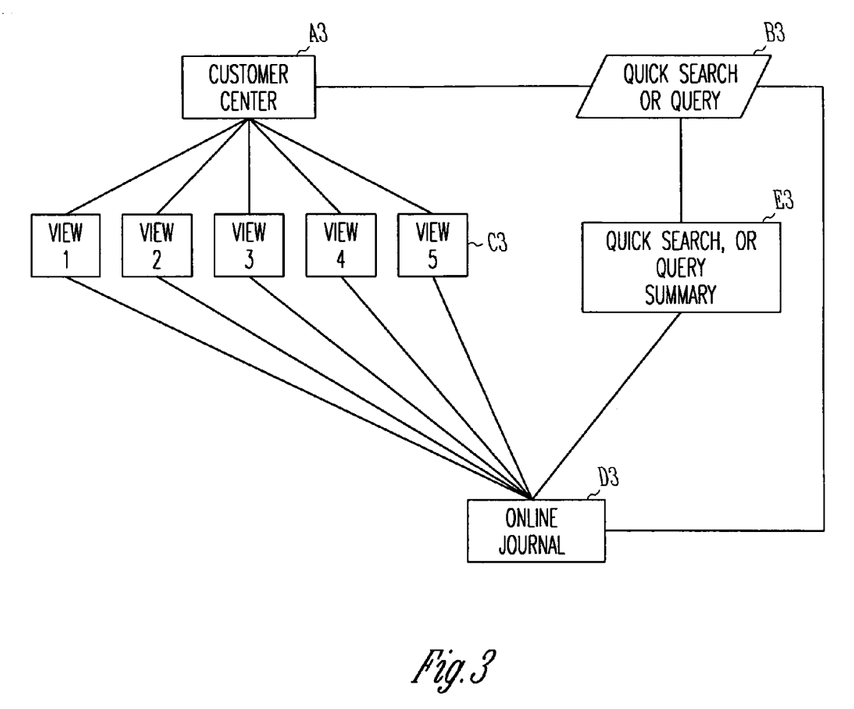
FIG. 3 is a high level flow chart depicting the collection agency client's navigation through different views and the Quick Search or Query function to arrive at the On Line Journal.

FIG. 3 depicts the navigation of the collection agency client's accounts using the system's "Quick Search or Query" function at step B3, "Views" function at step C3 and "On Line Journal" function at step D3. Starting at the "Customer Center" interface A3 (i.e., from the secure client site interface A2 as already seen in FIG. 2), the collection agency client user may choose from a plurality of views numbered 1 through 5 at step C3, or the invoke the "Quick Search" function at step B3. Views presented at step C3 include but are not limited to accounts sorted by the following parameters:

Debtor Name—accounts are sorted by the debtor's name.

Account Number—accounts are sorted by the clients account number.

State—accounts are sorted by the state the debtor is located in.

Status—the accounts are sorted by the current status.

Date Entered—the accounts are sorted by the date that they entered the production system.

Debtor Code—the accounts are sorted by the debtor code that is assigned to the account by the collection agency software.

Amount Range—the accounts are sorted and subset by a predetermined dollar amount.

Each view presents "Total Amount Due", "Total Amount Paid" and "Original Amount Due" for the specific sorting criteria and may also include "Amounts Collected, "Year to Date" and "Month to Date". This provides the clients a "Quick Status" of their accounts sorted by the particular sorting parameter. Other sorting parameters, queries and calculated fields may be programmatically predefined and utilized against the data retrieved from the collection agency software database. From any view presented at step C3, the collection agency client is presented with links to the individual accounts listed in the order defined by the particular view. The client may choose a link and be presented with the "On-Line Journal" at step D3.

From the "Customer Center" at step A3, the collection agency client may choose to use the "Quick Search" function at step B3 by entering a debtor name, or other criteria into the text entry box. The collection agency client is returned a view at step E3 listing the results of the "Quick Search" or query. The client may then choose a link and be presented with the "On-Line Journal" at step D3.

Figure 4:
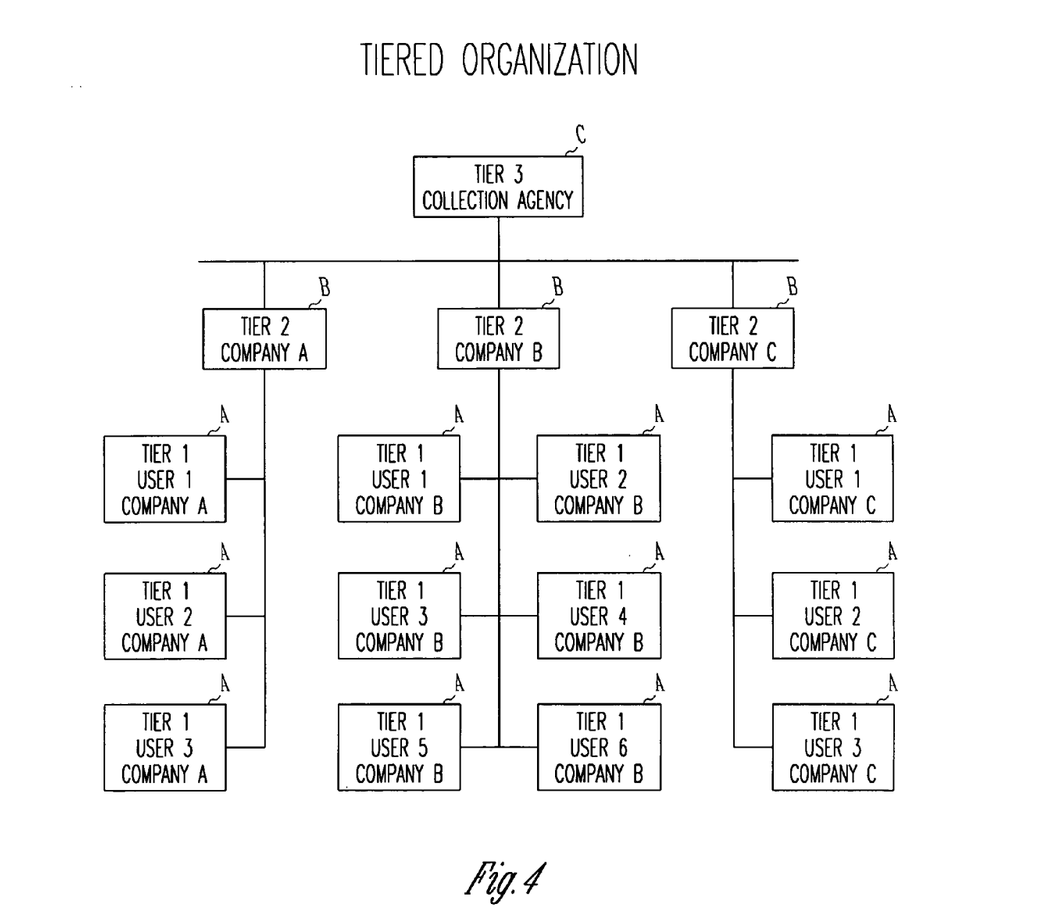
FIG. 4 is a pictorial representation of a tiered access scheme.
Figure 5:
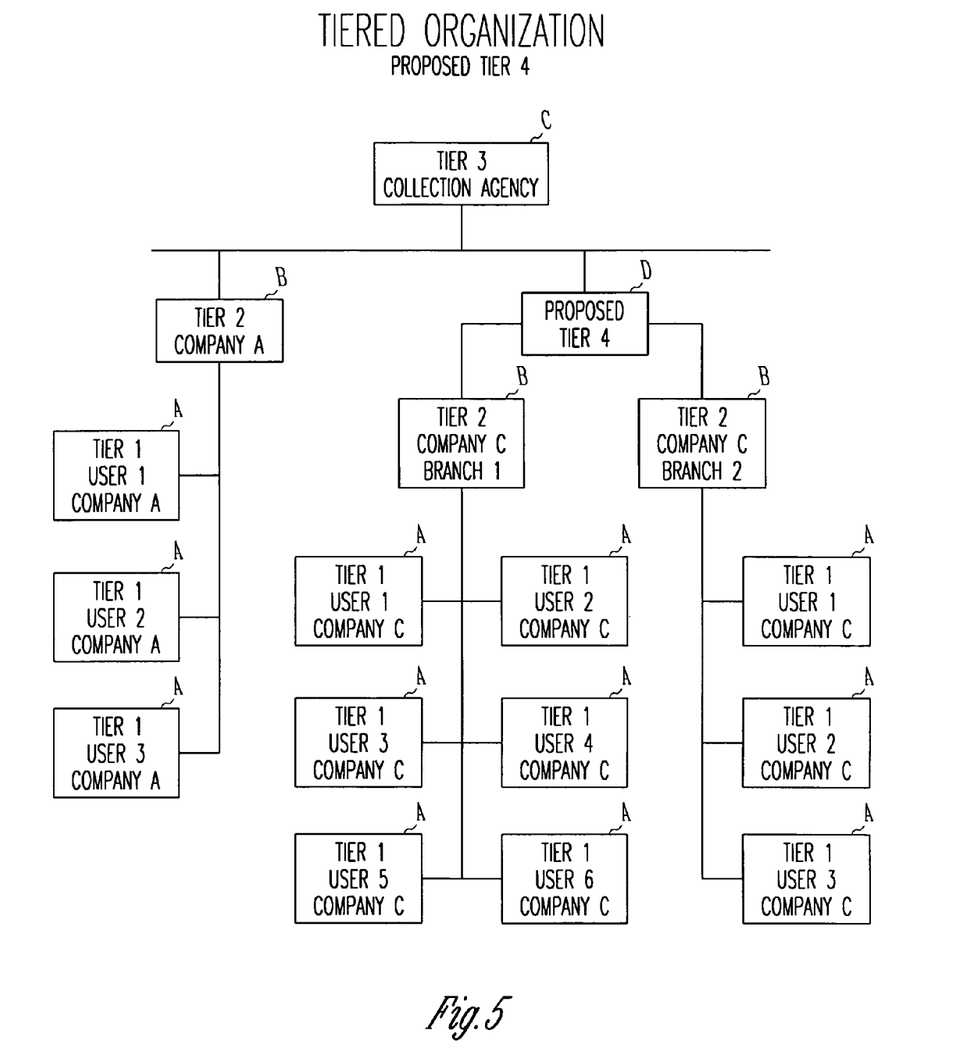
FIG. 5 depicts a tier being added to the access scheme.

FIGS. 4 and 5 show pictorial representations of the tiered access scheme used in the system. Access to the accounts and their associated data is controlled by a multi-tiered access structure. In this embodiment, three access tiers are provided that limits individual clients to access of only their accounts (Tier 1), but allows supervisory and management personal (Tier 2) to access all accounts placed or belonging to the individuals in their charge. It further allows access to all the accounts on the production system to the management and other authorized personnel employed by the agency (Tier 3).

As can be seen from FIGS. 4 and 5, Tier 1 users A have access to only the collection accounts owned by them, while Tier 2 users B have access to the accounts of all Tier 1 users employed by the same client company. This allows management access for department or location managers to view and ascertain the status of the accounts of those working below them. As can be further seen from FIGS. 4 and 5, Tier 3 users C are collection agency employees and authorized others who are allowed full access to all the accounts on the system. This enables collection agency personnel working in remote locations to view and determine the status of accounts. FIGS. 4 and in particular 5 also show methods to add further access tiers. A proposed Tier 4 user D would have access to all of company C's accounts allowing central management of a plurality of Tier 2 users and the Tier 1 users below them. Additional tiers may be added to the system to accommodate a plurality of client organizational structures.

FIG. 6 shows a pictorial representation of the display of the "On-Line Journal". FIG. 6 is an actual print-out of the "On-Line Journal" from a system such as is being described and illustrates the plurality of account data made available to the collection agency client. The ledger section A6 of the display contains all the data fields from the collection agency software and presents the data in an easily read manner to the collection agency client. Section B6 lists any transactions for the account including Debtor Code, Transaction Date, Collector ID Number, and the amount of the payment. Section C6 lists the collector comments on the account along with Debtor Code, Comment Date and Collector Number. The display also provides a link to an online form where the collection agency client may send a comment, question or instruction about the account. Section E6, labeled "Other Client Information," shows the Client Code that is assigned by the collection agency to this client and the Reference Code or client's account number on this debtor.

Although the invention has been described with reference to the foregoing specific embodiments, many alternatives, variations, and modifications will be apparent to those of ordinary skill in the art. Those alternatives, variations, and modifications are intended to fall within the scope of the following appended claims.

What is claimed is:

1. A method for allowing selective access by a client of a collection agency to information from debt collection by the collection agency, comprising:

storing a plurality of account data items in a database, each data item being associated with an account belonging to the client of the collection agency, the plurality of data items including information relating to debt owed to the client by one or more debtors;

processing database access requests with a network server from a user process controlled by a remote user;

processing credentials to authenticate the remote user as a client representative; and processing data access requests in accordance with a defined access scheme such that the client representative can access only data items associated with an account belonging to the client to allow remote review and reporting of the account data items.

2. The method of claim 1, further comprising allowing access to data items in accordance with a defined access scheme providing for a plurality of access tiers such that the client representative is allowed access only to those client account data items allowed by the tier to which the client representative has been assigned.

3. The method of claim 2, further comprising accessing data stored in the database with a database server, wherein the network server communicates with the database server by a common gateway interface script executed by the network server.

4. The method of claim 2, further comprising accessing data stored in the database with a database server, wherein the network server communicates with the database server by executing a java applet that communicates with the database server over the network.

5. The method of claim 2 wherein the database contains one or more tables with each table containing one or more records with one or more defined data fields for storing data items therein according to type, the records thereby serving to group the data items into data entities, with each of such data entities being associated with a particular account.

6. The method of claim 5 wherein one of the stored data items is an account identifier that is related to each data item in the database to identify the account with which the data item is associated.

7. The method of claim 6 wherein one of the stored data items is a client identifier that is related to the account identifier to identify the client to which the account belongs.

8. The method of claim 7 further comprising restricting a particular client's data access to views of the data items that include the client identifier for that client.

9. The method of claim 5 further comprising restricting data access of particular client-representatives to selected views of the data items to which the client has data access.

10. The method of claim 5 further comprising presenting to a client representative accessing the database through a web browser, upon request, a plurality of selected views of data items associated with accounts belonging to the client.

11. The method of claim 10 wherein the data items related to an account and presented in a selected view are chosen from a group consisting of an account identifier, a name of a debtor on the account, a state in which the debtor is located, amounts paid on the account, amounts owing on the account, original amount due, account status, and a collector's notes on an account.

12. The method of claim 11 further comprising presenting a selected view that includes data items sorted according to a selected data item.

13. The method of claim 12 further comprising presenting a selected view that includes data items sorted according to a selected data item chosen from a group consisting of a debtor name, a debtor identifier, the account identifier, state in which a debtor is located, account status, date on which an account was entered into a system, and by a range of amounts owed on an account.

14. The method of claim 11 further comprising presenting a selected view that includes a link to an online-ledger for each account represented in the selected view, wherein the online-ledger presents a plurality of data items associated with a single account.

15. The method of claim 11 further comprising allowing the client to insert comments into a designated record field in accordance with a particular access tier.

16. The method of claim 5 wherein the data items include a debtor identifier and amount owed on an account.

17. The method of claim 16 further comprising processing credentials transmitted by the user process to authenticate the identity of the user as an agency representative, and wherein the tiered access scheme includes an access tier for agency representatives that allows access to all data items contained in the database.

18. The method of claim 16 further comprising allowing for differential client access to accounts owned by a client among representatives of the client in accordance with a management structure of the client.

19. The method of claim 16 further comprising allowing a client representative to enter a new account into a system along with data items associated with that account in accordance with an access tier.

20. The method of claim 16 further comprising allowing a user process to query the database with relational expressions and be presented with data responsive to the query in accordance with the defined access scheme.

21. The method of claim 1, wherein the method is carried out on a network that is the Internet.

* * * * *

UNITED STATES PATENT AND TRADEMARK OFFICE
CERTIFICATE OF CORRECTION

| | | |
|---|---|---|
| PATENT NO. | : 7,167,839 B1 | Page 1 of 1 |
| APPLICATION NO. | : 09/435198 | |
| DATED | : January 23, 2007 | |
| INVENTOR(S) | : Layne | |

It is certified that error appears in the above-identified patent and that said Letters Patent is hereby corrected as shown below:

On the Title page, Item (56), under "Other Publications", in column 2, line 1, delete "Colletion;" and insert -- Collection; --, therefor.

In column 7, line 29, in Claim 4, after "with" delete "the" and insert -- a --, therefor.

Signed and Sealed this

Seventh Day of August, 2007

JON W. DUDAS
*Director of the United States Patent and Trademark Office*